VERTICAL SUBSURFACE SECTION

VERTICAL SUBSURFACE SECTION

INVENTORS
Eugene R. Brownscombe
Henry F. Dunlap
Loyd R. Kern
Thomas K. Perkins

BY
Attorney

HORIZONTAL SUBSURFACE SECTION

United States Patent Office 3,283,813
Patented Nov. 8, 1966

3,283,813
SALINE WATER CONVERSION BY
SUBSURFACE PROCESSES
Eugene R. Brownscombe and Henry F. Dunlap, Dallas, Loyd R. Kern, Irving, and Thomas K. Perkins, Dallas, Tex., assignors to The Atlantic Refining Company, Philadelphia, Pa., a corporation of Pennsylvania
Filed Sept. 22, 1965, Ser. No. 489,129
9 Claims. (Cl. 166—9)

The present application is a continuation-in-part application of application Serial No. 201,819, filed June 12, 1962, now abandoned.

The invention relates generally to processes for reducing the salt concentration of saline water which are performable in subsurface earth formations and wherein the energy necessary to effect the conversion is supplied from the surface.

There are tremendous resources of salt and chemically charged waters potentially useful as sources of fresh water. Conversion of saline water to potable water, therefore, assumes prime importance. Many processes have been developed which will do the job. For instance, boiling water and condensing the vapor is as old as history. But to convert salt water to potable water economically is extremely difficult. It has become apparent that further rapid reduction in costs of converted water will require new approaches based on new concepts and ideas.

Accordingly, it is an object of the present invention to provide new methods for converting saline water to potable water.

Another object of this invention is to provide methods for reducing the salt content of saline water by conducting desalting operations in subsurface formation.

Another object is to provide methods whereby energy supplied to a selected subsurface formation from the surface is employed to reduce the salt content of injected saline water.

Another object is to provide methods for converting saline water to potable water by reverse osmotic techniques performed in subsurface formations.

Another object is to provide methods whereby pressure applied to saline water in a selected subsurface formation is used to separate the saline water into water of reduced salt content and concentrated brine.

Other more specific objects are recited in the specification and, additionally certain inherent objects will be recognized by those skilled in the art.

Referring to the drawings.

Briefly, the present invention involves methods for producing potable water comprising (1) drilling one or more boreholes to a selected subsurface formation, (2) injecting saline water in the formation, (3) supplying energy from the surface to separate the injected saline water into water of reduced salt content and concentrated brine portions, (4) withdrawing the water of reduced salt content to the surface, and (5) removing the concentrated brine from the formation.

Figure 1:
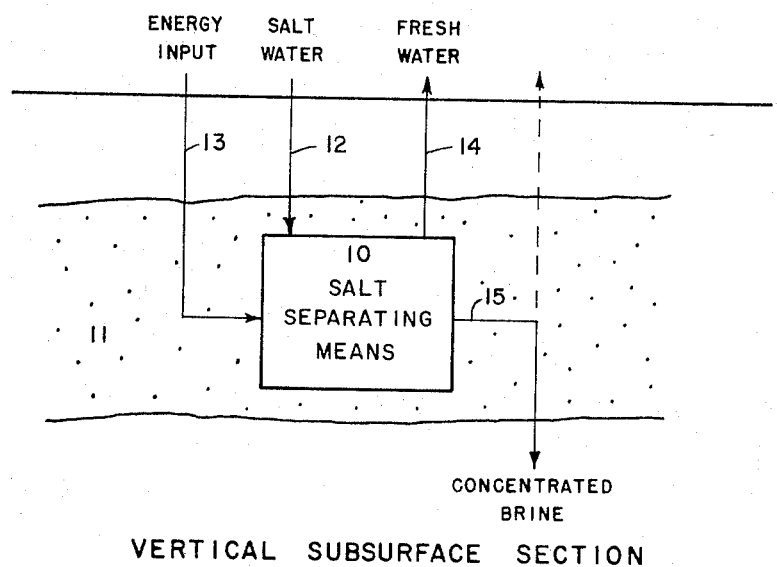
FIGURE 1 is a vertical cross-sectional view of the earth illustrating the general method for converting saline water to potable water by subsurface processes.

Now, considering FIGURE 1, salt separating means 10 is located or positioned in permeable subsurface formation 11. Saline water is introduced through inlet means 12 to formation 11. Energy to effect the desired separation is supplied by energy input 13.

Potable water produced by the conversion process is withdrawn via outlet means 14. Concentrated or waste brine which accumulates as a by-product of the conversion is removed by outlet means 15 to a remote subsurface location or to the surface.

Operations are conducted, energy is supplied, and materials are introduced and withdrawn by means of one or more boreholes or wells which are drilled to formation 11 from the surface. It follows, therefore, that any conversion process within the scope of the present invention will require that the energy which is supplied to formation 11 be in a form that is readily transmittable down a borehole. For example, the input of energy may comprise hydraulic pressure, electrical power, thermal energy, etc., or various combinations thereof.

The much preferred method of operation utilizes energy in the form of hydraulic pressure as the driving force for the saline water conversion in accordance with the principles of reverse osmosis. This method can be further defined as (1) drilling at least one borehole to a permeable subsurface formation, (2) fracturing the formation to produce at least one fracture, (3) depositing osmotic material within each fracture so produced as a continuous layer, (4) injecting the saline water into the formation, (5) applying pressure to the saline water in excess of its osmotic pressure to convert the saline water into water of reduced salt content and concentrated brine portions, (6) withdrawing the water of reduced salt content to the surface, and (7) removing the concentrated brine from the formation.

Figure 2:
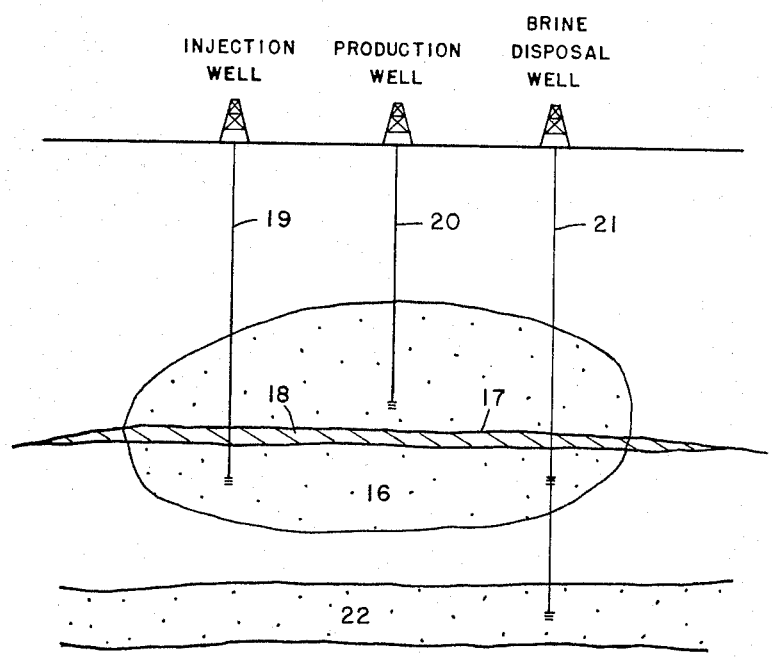
FIGURE 2 is a vertical cross-sectional view of the earth showing one embodiment of the desalination of water by reverse osmosis in a subsurface formation.

FIGURE 2 shows one embodiment of a reverse osmotic operation for desalting water by an underground process. Permeable formation 16 is shown as a sand lens or trap in surrounding impermeable earth material, e.g., shale or the like. Fracture 17 forms a plane which extends across formation 16. Osmotic material is deposited within fracture 17 forming continuous layer or membrane 18. Saline water is injected into formation 16 and hydraulic pressure on the order of 500 to 1500 p.s.i. is applied through injection well 19. Water having reduced salt content is produced by production well 20. Concentrated brine is removed from formation 16 by disposal well 21 to spaced-apart formation 22. (As operations are set up in FIGURE 2, gravity forces will aid in keeping the concentrated brine away from membrane 18.)

Fracture 17 is produced by well-known techniques which include disposing a fluid in formation 16 and supplying sufficient pressure to the fluid to overcome the overburden pressure and crack formation 16. Fracture 17 is shown extending horizontally across formation 16, however, the fracturing may be vertical or inclined with respect to the surface. Also, instead of a single fracture, a series of substantially parallel fractures can be produced within formation 16 so that a pluarlity of adjacent osmotic layers or membranes can be formed.

Once suitable osmotic material has been deposited in fracture 17, the fluid pressure which maintains fracture 17 is gradually reduced so that the faces of fracture 17 will close about layer 18. This compacts and compresses layer 18 thereby holding the osmotic material firmly in position.

Osmotic layer 18 can consist of osmotic material formed as a continuous and unitary membrane (sheet) or can be formed from a continuous composition of separate particles or units of the osmotic material. The unitary membranes can be prepared by special casting procedures involving in situ polymerization. By way of example, an emulsion of monomeric osmotic material and polymerization catalyst may be injected in formation 16 under conditions such that the emulsion breaks on contacting the face of fracture 17. This action would activate the monomer and initiate polymerization causing formation of unitary osmotic layer 18.

Preferably, however, osmotic layer 18 is comprised of a composite of separate particles. It is still further preferred that osmotic layer 18 be comprised of numerous discrete particles as opposed to several relatively large units as this generally results in improved efficiency for demineralizing water. Thus, the diameter of at least one dimension of these particles should be less than about $100\mu$ and where possible less than $10\mu$. In other words, there is a maximum preferred cross-sectional thickness of the size noted in at least one direction. Also, a minimum size restriction is imposed because osmotic membranes composed of very small particles are characterized by reduced rates of water production due to decreased flow rates. Accordingly, the individual particles should have an average diameter greater than about $0.10\mu$ and preferably greater than $1.0\mu$.

Osmotic membranes comprised of a composite of separate particles can be prepared in formation 16 by depositioning osmotic material in fracture 17 by filtration and like techniques. Special reference is made to copending application Serial No. 477,036, filed August 3, 1965.

Whether unitary or comprised of separate particles, layer 18 should not much exceed the minimum thickness which gives an adequate degree of demineralization. Membranes which are unnecessarily thick provide water at reduced rates of production. The optimum thickness in each case will depend on the character of the osmotic material, the salinity of the feed water, prevailing temperature and pressure conditions in formation 16, etc. Generally, a convenient rule of thumb is to require that the cross-sectional thickness of layer 18 be less than about 10 mm. and preferably less that 1.0 mm.

The osmotic material for our novel membranes can be any suitable water insoluble material which can form a barrier impermeable to dissolved salts in water. One possibility would be to use a substance containing an ionic charge that would prevent passage of salt ions. Such a membrane would restrict the ions of one charge by the presence of active sites of the same charge; the fact that the movement of one set of ions is limited in its ability to pass through the membrane would likewise limit the flow of ions of the opposite charge.

Examples of such "ion exclusion materials" are clays, resins, etc., having a high fixed ion concentration. Among the clays, the montmorillonites such as the bentonites are particularly useful. The resins referred to may be natural or synthetic substances and include sulfonated polystyrene, chloromethylated polystyrene, etc.

Another possibility would be to use an osmotic material of the type where separation depend mainly on the ability of water to solvate active sites on a membrane formed of the material. Salt ions are rejected because the bound water has little solution capability. Such substances may be termed "water solvatable materials" and are generally synthetic plastics such as cellulose acetate, cellulose propionate, polyvinyl alcohol, polyvinyl acetate, etc.

Sometimes is is advantageous to employ a mixture of several osmetic materials with the view toward increasing the efficiency of the desalination process. For example, a composite membrane may be prepared partially from an ion exclusion material and partially from water solvatable material. This is particularly advantageous where the ion exclusion material can also function as a "plugging agent" blocking the spaces which may exist between the indiivdual particles of the water solvatable material.

Figure 3:
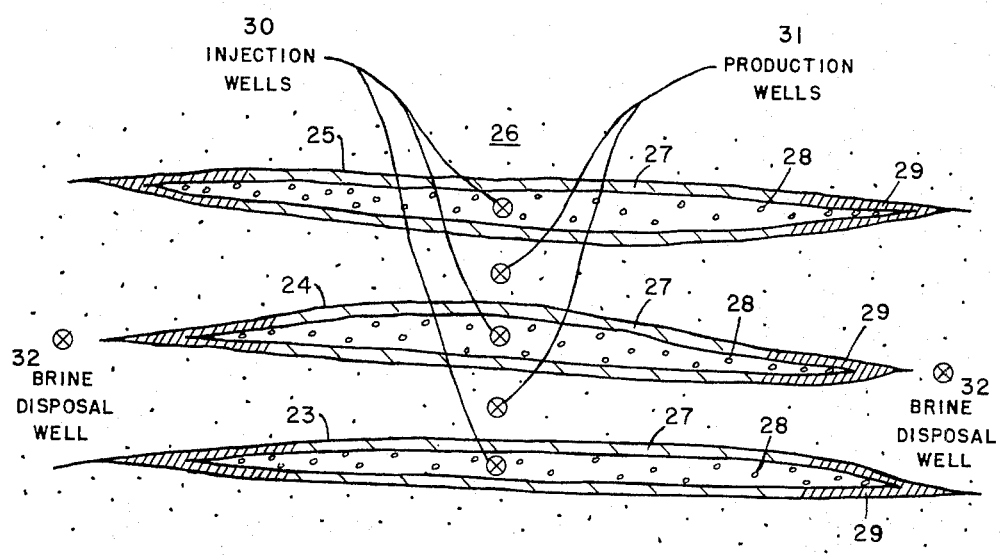
FIGURE 3 is a horizontal cross-sectional view of the earth showing a second embodiment for desalting water by reverse osmosis in a subsurface formation.

Referring to FIGURE 3, another embodiment of a reverse osmotic operation for desalting water by an underground process is disclosed. Adjacent parallel fractures 23, 24, and 25 are formed vertically in permeable sub- surface formation 26, extending into impermeable formations (not shown) above and below formation 26. Suitable osmotic material (see supra) is deposited within each fracture as layers or membranes 27. Granular propping agent 28 is used to maintain the fractures. A nonosmotic fluid loss control agent occupies the terminal or remote end portions of the fractures as layers 29.

Saline water under an applied pressure in excess of its osmotic pressure is introduced to the interior of fractures 23, 24, and 25 by means of injection wells 30. A reverse osmotic process takes place whereby water of reduced salt content is pressured through the osmotic material, i.e., layers 27, and passes into formation 26. The concentrated brine which forms or collects within the fractures is transmitted along channels, cracks, etc., formed by propping agent 28 to the terminal portions of the fractures where it passes through fluid loss control agent 29 into formation 26. The water of reduced salt content is recovered via production wells 31; the concentrated brine may be removed from formation 26 by means of brine disposal wells 32, or, in cases where permeable formation 26 extends for great distances laterally, it may simply flow away into the remote reaches of formation 26.

Where desired, of course, only two fractures need be made in order to practice this embodiment of the invention. However, higher rates of production can be achieved by utilizing as many fractures in the series as possible. It follows, therefore, that it may be desirable to have 4, 5, 6, etc. fractures in a single grouping or series.

Fluid loss control agent 29, being essentially nonosmotic in character, functions by allowing passage of the concentrated brine into formation 26 while maintaining sufficient hydraulic pressure within the respective fractures to permit reverse osmotic operations. Examples are materials such as asphalt, sulfonated petroleum bottoms, starch, etc.

Layers 27 are deposited so that the major portion of the face of their respective fractures is covered. Usually, it is desirable to form the osmotic material on about 0.7 to 0.9 of the inside surface area of each fracture. A fluid loss control agent is then deposited as layers 29 on the face of each fracture over the remainder of the surface area. The area ratio of osmotic material to fluid loss control agent which should be used can be calculated more precisely by taking the inverse of their permeability ratio.

By controlling the amount of osmotic material introduced one is able to form layers 27 over the desired surface area of each fracture. Deposition of the osmotic material commences adjacent injection well 30 and extends outwardly therefrom toward the remote end portions of the fractures. When the inside areas of the fractures are covered to the desired ratio, the input of the osmotic material is stopped and the selected fluid loss control agent is introduced. Because of the fluid loss control properties of the osmotic material, the special fluid loss control material passes to the remote end portions of the fractures where it is deposited as layers 29.

Further in regard to the embodiment shown in FIGURE 3, the use of propping agent 28 is not critical since, fractures 23, 24, and 25 can be maintained open during the reverse osmotic process by applied pressure. (Of course, whether a propping agent is used or not, the applied pressure must be less than the fracture extension pressure in each instance.) Suitable propping agents include sand, glass beads, aluminum or iron shot, walnut hulls and other water-insoluble, inert, granular materials.

One additional aspect warrants comment. It may be desirable to inject an impermeable plastic (not shown in the drawings) into the area around the bottom of injection wells 30 for a depth of a few inches to a few feet in order to prevent leakage around the osmotic material. Fractures 23, 24, and 25 would extend well beyond the sealed zone created by the injected plastic so that the reverse osmotic operations could be conducted otherwise as discussed above.

Referring back to FIGURE 1, there are several alternate methods of operation to a reverse osmotic process. A second general desalination procedure could be based on the absorption of salt ions on cation and anion responsive materials by establishing an underground electrolysis system. Still another general desalination mode of operation could be based upon a subsurface process of electrodialysis. Still other procedures will be evident to those skilled in the art in view of the present teachings.

What is claimed is:

1. A method for producing water having a reduced salt content by a subsurface process of reverse osmosis comprising
    (a) drilling a plurality of boreholes to a permeable subsurface formation,
    (b) fracturing said formation to produce at least one fracture,
    (c) depositing osmotic material within each said fracture as a continuous layer,
    (d) injecting saline water into said formation through a first borehole,
    (e) applying pressure to said saline water in excess of its osmotic pressure to convert said saline water into water of reduced salt content and concentrated brine portions,
    (f) withdrawing said water of reduced salt content to the surface through a second borehole, and
    (g) removing said concentrated brine from said formation through a third borehole.

2. The method of claim 1 where said concentrated brine is conveyed by said third borehole to a spaced-apart disposal bed.

3. The method of claim 1 where said layer of osmotic material has a cross-sectional thickness less than about 10 mm.

4. A method for producing water having a reduced salt content by a subsurface process of reverse osmosis comprising
    (a) drilling a plurality of boreholes to a permeable subsurface formation,
    (b) fracturing said formation to produce at least one fracture,
    (c) depositing osmotic material within each said fracture as a continuous layer,
    (d) injecting saline water through a first borehole extending into said formation on one side of each said fracture,
    (e) applying pressure to said saline water in excess of its osmotic pressure,
    (f) withdrawing water of reduced salt content which has passed through said osmotic material by means of a second borehole located on the opposite side of each said fracture, and
    (g) removing concentrated brine through a third borehole located on said side of said fracture, where said saline water was injected.

5. The method of claim 4 where, prior to step (d), each said fracture is allowed to close on and compress said layer of osmotic material.

6. The method of claim 4 where said layer of osmotic material is comprised of numerous discrete particles having an average diameter less than about $100\mu$ and greater than about $0.10\mu$.

7. A method for producing water having a reduced salt content by a subsurface process of reverse osmosis comprising
    (a) drilling a plurality of boreholes to a permeable subsurface formation,
    (b) fracturing said formation to produce at least two fractures,
    (c) depositing osmotic material within each said fracture as a continuous layer over a major portion of the surface thereof,
    (d) depositing a nonosmotic fluid loss control agent over the remainder of said surface,
    (e) injecting saline water into the interior of each said fracture through boreholes extending within said fractures,
    (f) applying pressure to said saline water in excess of its osmotic pressure,
    (g) withdrawing water of reduced salt content which has passed through said osmotic material through at least one borehole located without said fractures in proximity to said osmotic material, and
    (h) removing concentrated brine which has passed through said fluid loss control agent through at least one borehole located without said fractures in proximity to said fluid loss control agent.

8. The method of claim 7 where, prior to step (e), a propping agent is placed within said fracture.

9. The method of claim 7 where a plurality of substantially parallel vertical fractures is produced in step (b).

References Cited by the Examiner

UNITED STATES PATENTS

| 3,046,222 | 7/1962 | Phansalkar et al. | 166—42.1 X |
| 3,140,986 | 7/1964 | Hubbard | 202—234 X |
| 3,153,450 | 10/1964 | Foster et al. | 166—42 |
| 3,177,940 | 4/1965 | Ten Brink | 166—39 |

OTHER REFERENCES

Le Vesque: "Giant Still May Use Earth's Heat," Science and Mechanics, October 1951 (pages 95, 96, and 97).

Office of Saline Water Research and Development Progress Report No. 16, United States Department of Interior, "Water and Ion Flow Through Imperfect Osmotic Membranes," April 1957 (pp. 3 to 16).

JACOB L. NACKENOFF, Primary Examiner.

CHARLES E. O'CONNELL, Examiner.

S. J. NOVOSAD, Assistant Examiner.